United States Patent [19]
Nielsen

[11] Patent Number: 5,106,734
[45] Date of Patent: Apr. 21, 1992

[54] PROCESS OF USING LIGHT ABSORPTION TO CONTROL ENZYMATIC DEPOLYMERIZATION OF HEPARIN TO PRODUCE LOW MOLECULAR WEIGHT HEPARIN

[75] Inventor: Jorgen I. Nielsen, Farum Denmark

[73] Assignee: Novo Nordisk A/S, Bagsvaerd, Denmark

[21] Appl. No.: 43,960

[22] Filed: Apr. 29, 1987

[30] Foreign Application Priority Data

Apr. 30, 1986 [DK] Denmark .................... 1968/86
Apr. 30, 1986 [DK] Denmark .................... 1969/86

[51] Int. Cl.$^5$ .................... C12P 19/26; C12N 11/00; A61K 31/725; C08B 37/10
[52] U.S. Cl. .................... 435/84; 435/174; 435/177; 435/803; 435/813; 514/56; 536/21
[58] Field of Search .................... 435/13, 84, 269, 174, 435/177, 803, 813; 536/21; 514/56

[56] References Cited

U.S. PATENT DOCUMENTS 4,396,762 8/1983 Langer et al. .................... 435/269 X

FOREIGN PATENT DOCUMENTS 1180292 1/1985 Canada .................... 435/84

2945595 5/1981 Fed. Rep. of Germany ........ 536/21

OTHER PUBLICATIONS

Deeslie, et al., J. Food. Sci., vol. 46, No. 4, 1981, pp. 1035–1042.
Porter, et al., Chem. Tech., Jan. 1971, pp. 56–63.

Primary Examiner—David M. Naff
Attorney, Agent, or Firm—Fidelman & Wolffe

[57] ABSTRACT

A method is provided for controlling production of low molecular weight heparin (LMW-heparin) when depolymerizing heparin with heparinase in a reaction mixture in a reactor. Depolymerization to a desired average molecular weight is monitored by measuring an increase in UV-absorption (preferably at 230–235). When the absorption has reached a value for a desired molecular weight, the depolymerization is stopped or LMW-heparin having the desired molecular weight is continuously removed from the reaction mixture. In a preferred embodiment, the reaction mixture is subjected to ultrafiltration to produce a filtrate containing LMW-heparin, and a retentate which is recycled to the reactor. UV-absorption and refractive index of the filtrate are measured, and depolymerization is controlled in accordance with the measured absorption and refractive index to produce a filtrate containing a LMW-heparin of low polydispersity and predetermined molecular weight.

9 Claims, 4 Drawing Sheets

PROCESS OF USING LIGHT ABSORPTION TO CONTROL ENZYMATIC DEPOLYMERIZATION OF HEPARIN TO PRODUCE LOW MOLECULAR WEIGHT HEPARIN

The present invention relates to a method for the production of low molecular weight heparin (LMW-heparin) by enzymatic depolymerization of heparin.

Conventional heparin is a heterogenous mixture of mucopolysaccharides covering a molecular weight range from 5000–50000 daltons with a number average molecular weight of about 10–14000 daltons.

Heparin acts directly or indirectly on the function of a number of proteins particularly the enzymes of the coagulation cascade.

The effects of heparin are influenced by a number of factors, such as the distribution of functional groups in the molecule and the molecular weight. Thus it is firmly established that the latter plays an important role for the activity of heparin, especially the inactivation of Thrombin and Factor Xa mediated by Antithrombin III.

Antithrombin activity demands a minimum heparin molecular weight corresponding to about 18 monosaccharides i.e. about 5400 daltons whereas anti Factor Xa activity can be expressed by heparin molecules as small as 5–6 saccharide units 1500–1800 daltons.

A series of other effects of heparin e.g. antithrombotic effect (heparin oligosaccharides containing 18 monosaccharides or less seem to have poor antithrombotic activity) influence on ADP-induced thrombocyte aggregation, bioavailability after s.c. administration, inhibition by $PF_4$ and HRG as well as the activity against coagulation enzymes of the intrinsic pathway responsible for generating Factor Xa are strongly influenced by the molecular weight of heparin.

In recent years the interest has been centered on heparin fragments or—fractions with high XaI/ antithrombin activity with molecular weight from 4000 daltons to upwards of 6000, since such substances have been reported to have good antithrombotic efficiency and at the same time no or little tendency to cause bleeding complications. They also show enhanced bioavailability especially after subcutaneous administration.

Since the selectivity of heparin action is correlated to the molecular weight, it is likely that a relatively narrow molecular weight range exists in which heparin activity is optimal.

A method for preparing LMW-heparin with a specific, desired molecular weight and a narrow molecular weight distribution i.e. low polydispersity would therefore be advantageous.

The method of this invention enables attainment of any desired molecular weight range of depolymerization product from heparin.

LMW-heparin can be prepared in low yield from conventional heparin by fractionation (DOS Nos. 2,944,792 and 2,945,595). Most LMW-heparin is, however, prepared by depolymerization of heparin by either chemical or enzymatic methods followed by fractionation, if necessary (cfr. A. Horner, Heparin, Kakkar, eds. Thomas, 1976 and Perlin et al. Carbohydrate Res. 18, 185 (1971).

Chemical depolymerization of heparin is described in EP published patent applications Nos. 0037,319, 0076,279 and 0014,184, U.S. Pat. No. 4,351,938, and GB patent No. 2,002,406.

Enzymatic depolymerization is described in US patent No. 3,766,167, GB patent No. 2,002,406, EP published patent application No. 0014,184, and U.S. Pat. No. 4,396,762.

A major problem inherent to all of the known batch depolymerization processes is to stop the depolymerization reaction at the correct average molecular weight. Moreover, the depolymerization reaction results in heparin fragments of smaller or larger size than the desired molecular weight, even in the absence of side reactions.

In the known depolymerization processes for depolymerization of heparin which use inorganic depolymerization reagents (nitrous acid, hydrogen peroxide, etc.) no preference exists as to size of molecule attacked or as to position within the molecule of the bond to be broken. According to R. J. Linhardt et al., Biochem.Biophys.Acta 702 (1982) 197–203 not even the enzyme heparinase makes any such distinction the mode of action of heparinase being random endolytic.

This means that the polydispersity of any heparin depolymerization mixture develops in a statistically predictable way as a function of the degree of depolymerization. Especially at the time when average molecular weight is just above the desired value a large proportion of the fragments have the desired molecular weight but due to the random endolytic nature of the depolymerization they also have a proportionally large chance of becoming further depolymerized to give fragments of suboptimal size. A batch depolymerization should be halted at about this time.

However, heretofore the art has not developed satisfactory methods for controlling the depolymerization of heparin so as to obtain high yields of a predetermined LMW-heparin product.

An object of this invention is to provide a method for controlling an enzymatic depolymerization of heparin by heparinase in aqueous medium reaction mixture.

A further object of this invention is to provide a novel method for continuously depolymerizing heparin to a desired LMW-heparin product.

BRIEF STATEMENT OF THE INVENTION

According to the invention an enzymatic depolymerization of heparin by heparinase in an aqueous reaction mixture is controlled by measuring the increase in light absorption during the course of such a depolymerization, the increase being caused by generation of an increasing proportion of unsaturated heparin degradation products as the enzymatic depolymerization proceeds, an increase to be related to the weight average molecular weight of heparin and heparin degradation products in the reaction mixture; and regulating conduct of the enzymatic depolymerization in accord with the measured increase in light absorption so as to obtain a predetermined desired weight average molecular weight LMW-heparin product in the reaction mixture.

When a batch depolymerization is being controlled the method further comprises halting the enzymatic depolymerization when the predetermined desired weight average molecular weight LMW-heparin product in the reaction mixture is obtained.

When a continuous depolymerization is being controlled the method further comprises continuously feeding heparin into the reaction mixture and continuously removing predetermined desired weight average molecular weight LMW-heparin product from the reaction mixture.

A novel continuous depolymerization method forms part of this invention.

DISCUSSION OF THE INVENTION

To facilitate understanding of this invention, the discussion which follows is based within the context of batch polymerization.

During the course of the discussion reference will be made to the attached drawings wherein.

The average molecular weight of a heparin depolymerization reaction mixture may be estimated in a number of ways based on e.g. GPC-HPLC, viscosity measurement, light scattering or chemical or physical-chemical determination of functional groups created in the depolymerization process.

Most of the methods mentioned such as GPC-HPLC are time consuming and not easily adapted to large scale production and in fact the majority of the known processes used in manufacture of LMW-heparin are based on empirical methods relying on careful control of starting composition and reaction conditions to obtain the desired molecular weight at the end of the depolymerization reaction. However, due to inevitable variations during the depolymerization reaction, e.g. variations in enzyme activity, the molecular weight of the end product may vary from one batch to another and making it difficult to obtain a uniform product in high yield.

If a product with the correct average molecular weight is to be produced by each production batch, the depolymerization reaction must be stopped immediately when the desired average molecular weight has been reached in the depolymerization reaction mixture This requires that the change in the average molecular weight be followed by measurements for molecular weight determination having little or no lag time.

Heretofore no fast practical method existed for molecular weight determination of a depolymerization reaction mixture (containing LMW-heparin). One aspect of the present invention provides such a method.

The average molecular weight of heparin or a LMW-heparin may be given as the number average molecular weight ($M_n$), i.e. weight/number of moles, or as weight average molecular weight ($M_w$) or peak molecular weight ($M_{peak}$) $M_w$ or $M_{peak}$ are normally used to characterize heparin or LMW-heparin products.

Figure 1:
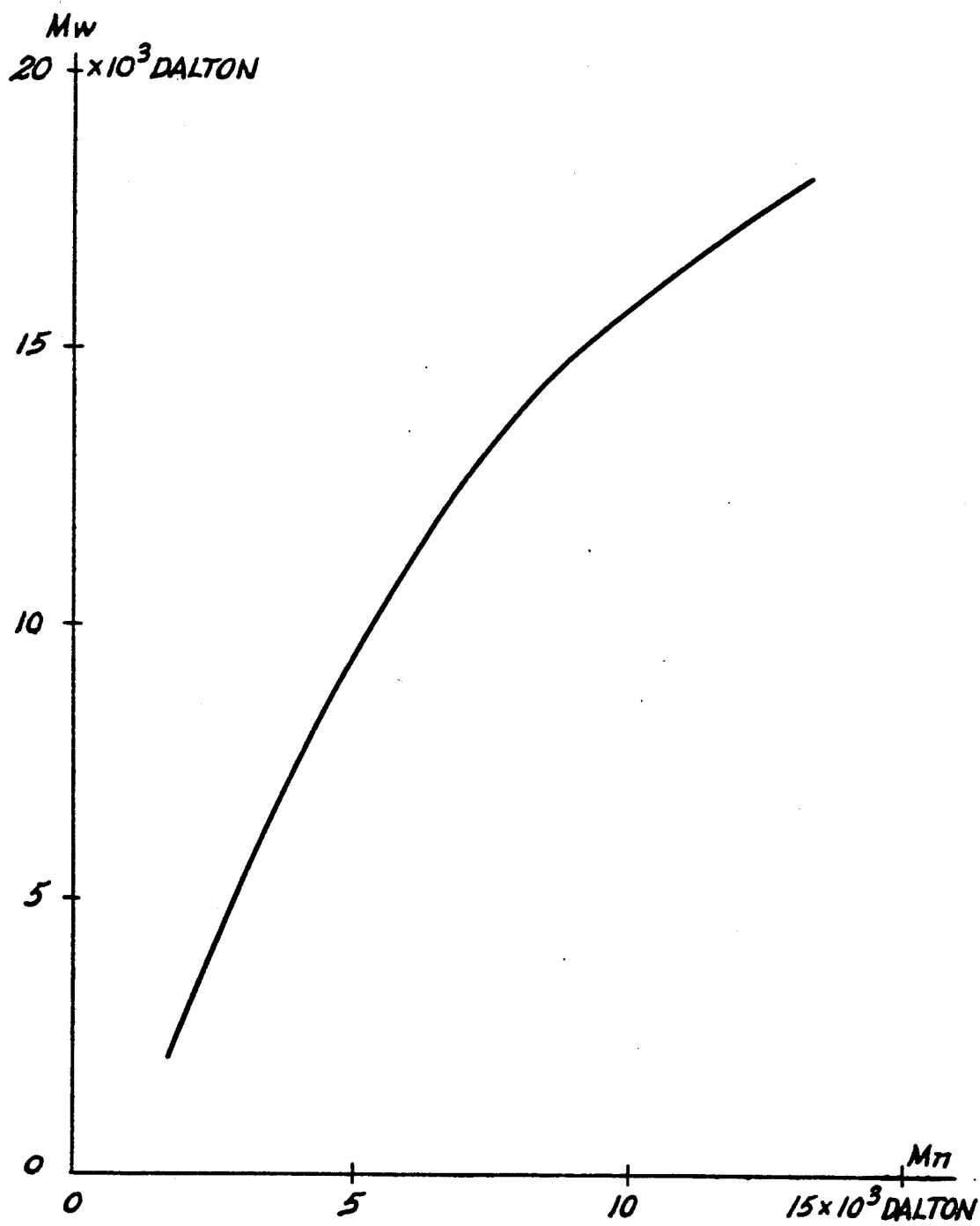
FIG. 1 is a graph of the relation between number average molecular weight ($M_n$) and weight average molecular weight ($M_w$) during a batch depolymerization of heparin, the latter being normally used to characterize heparin and low molecular weight heparin products, hereafter termed LMW-heparin products.

It has now been confirmed experimentally that the polydispersity (D), i.e. $M_w/M_n$, of a given heparin depolymerization reaction mixture changes in a regular way during the enzymatic depolymerization reaction of heparin. as shown in FIG. 1.

Practice of the present invention is based on a fast and reliable method to determine $M_n$ during the depolymerization of heparin with heparinase. As FIG. 1 provides the correlation between $M_w$ and $M_n$ the depolymerization of heparin to LMW-heparin of a given, desired $M_w$, can be achieved by depolymerization to a corresponding number average molecular weight $M_n$.

The enzymatic depolymerization process using heparinase lends itself to a spectrophotometric number average molweight ($M_n$) determination since the enzymatic process is eliminative creating one reducing endgroup and one endgroup consisting of a Δ4.5-unsaturated-iduronic acid derivative having a distinct UV-absorption at 230–235 nm. The molar absorption coefficient for a number of LMW-heparin fragments of di-,tetra-,hexa-, and oligo saccharides was published by Linker and Hovingh (Biochem. 11(1972), 563–568). The average value of the published molar absorption coefficients is 5500.

An equation such as $$\frac{1}{M_n} = \frac{1}{M_{n,u}} + \frac{\Delta A_{235}}{c \cdot \epsilon} \quad (1)$$

giving the relationship between number average molecular weight ($M_n$) and increase in absorption at 235 nm is easily derived.

In formula (1) $M_n$ is the number average molecular weight of the depolymerized product, $M_{n,u}$ is the number average molecular weight of the heparin substrate, c is the substrate concentration (g/l), $\Delta A_{235}$ is the increase in absorption at 235 nm and $\epsilon$ is the molar absorption coefficient.

Calculation of $M_n$ is possible when $M_n$ of the heparin substrate ($M_{n,u}$), substrate concentration (c, g/l) and the absorption coefficient ($\epsilon$) of the unsaturated depolymerization products are known and $\Delta A_{235}$ is measured.

In a number of experiments heparin was depolymerized with heparinase partially purified using hydroxyl apatite chromatography according to Linker and Hovingh (Methods in Enzymology 28(1972), 902–911).

The number average molecular weight $M_n$, was calculated using equation (1) and using the published value of $\epsilon = 5500$, and compared to $M_n$ determined by GPC-HPLC.

It was consistently found however that the calculated value of $M_n$ ($M_n(\Delta A)$) differed from the value of $M_n$ found using HPLC ($M_n(HPLC)$), by up to 20%.

Rearrangement of (1) into $$\Delta A_{235} = c \cdot \epsilon \left( \frac{1}{M_n} - \frac{1}{M_{n,u}} \right) \quad (2)$$

allows calculation of an absorption increase $\Delta A_{235}$ corresponding to a desired number average molecular weight $M_n$. But again experiments showed that if the depolymerization was halted at the calculated value of $\Delta A_{235}$ the actual $M_n$ determined by HPLC was considerably higher than the desired $M_n$ if the value of $\epsilon = 5500$ found by Hovingh and Linker was used.

It was concluded that the poor correspondance between $M_n(\Delta A)$ and $M_n(HPLC)$ was caused by the use of the value of $\epsilon = 5500$.

Rearrangement of equation (1) into $$\epsilon = \frac{\Delta A_{235}}{c} \cdot \frac{M_n \cdot M_{n,u}}{(M_{n,u} - M_n)} \qquad (3)$$

shows that $\epsilon$ may be calculated using known values of c and $M_{n,u}$ and simultaneously determined values of $\Delta A_{235}$ and $M_n$(HPLC).

In this way a value of $\epsilon = 7600$ was found which gave close correllation between calculated $M_n(\Delta A)$ and observed $M_n$(HPLC) in a number of experiments.

The possibility of calculating a correct value of $M_n$ based on the easily measured $\Delta A_{235}$ is basis for practice of the present invention according to one mode of which a batch enzymatic depolymerization of heparin is allowed to proceed until the calculated value of $\Delta A_{235}$ is reached whereupon the heparin depolymerization reaction is halted and the reaction mixture is worked up.

The heparinase used according to the present invention is prepared in per se known manner as described by Hovingh and Linker (Methods in Enzymology 28 (1972), 902–911 and J.Biol.Chem. 245 (1970), 6170–6175) by culturing *Flavobacterium heparium* on a heparin containing substrate, cell harvesting and cell rupture by sonication and purification by among others chromatography on hydroxyapatite. The degradation of heparin with heparinase is conducted in an aqueous medium as described for instance by Hovingh and Linker (J.Biol.Chem. 240 (1965), 3724–3728). When the desired $M_n$ value of the depolymerization mixture has been reached the heparinase is inactivated by known means, e.g. by lowering pH or a short heat treatment. The LMW-heparin product is then precipitated by known means, e.g. precipitation with alcohol, and purified by methods well known in the art, e.g. bleaching, sterile filtration and alcohol precipitation.

Calculation of the increase in the absorption at 230–235 nm $\Delta A_{235}$ corresponding to the desired $M_w$ of the product is made as follows:

a) reading on FIG. 1 of $M_n$ corresponding to the desired $M_w$ and b) calculation of $\Delta A_{235}$ corresponding to $M_n$ from a) by means of the above formula (2) using the value 7600 for $\epsilon$.

$A_{235}$ is measured by a spectrophotometer after acidification of the sample preferably to pH <2.5. It is obvious for the person skilled in the art that the increase in UV-absorption caused by the formation of unsaturated degradation products by the action of heparinase on heparin may be measured at other wave lengths than indicated here. The absorption coefficient is, however, preferably measured at 235 nm because it has its maximum at this wave length.

The depolymerization is halted when $\Delta A_{235}$ has reached the calculated value whereupon the LMW-heparin product is precipitated by addition of alcohol (preferably 0.6–10 vol/vol).

The heparin depolymerization reaction is preferably conducted at a temperature of 25–40° C. and at a pH of 6–8.

Example 1 illustrates the concordance of $M_n$ as determined by A and $\Delta A$ measurements to HPLC measurements ($M_n$ ($\Delta A$) to $M_n$ (HPLC)) of samples throughout the course of a batch depolymerization of heparin.

EXAMPLE 1

2.5 g heparin sodium, USP, $M_w = 17300$, $M_n = 12400$ daltons were dissolved in 25 ml 0.1 M sodium acetate, 0.01 M calcium acetate pH 7.0.

Heparinase, 0.8 ml, 1500 u/ml, specific activity 1050 u/mg was dissolved in 25 ml of 0.1 M sodium acetate.

One heparinase unit is defined according to Hovingh and Linker, Methods in Enzymol., 28(1972), 902–911.

The heparin substrate and the enzyme solution were mixed and incubated with gentle stirring in a water bath, thermostated at 30° C.

A sample taken immediately after mixing was diluted with 1.7 M perchloric acid, pH less than 2.5, filtered and the absorption was measured at 235 nm.

The absorption measurement was repeated a number of times as shown in the table below and simultaneously taken samples were heated briefly on a boiling water bath to destroy enzyme activity, cooled, diluted 5-fold with 0.5 M sodium sulphate and filtered and the molecular weight was analyzed by GPC-HPLC.

The GPC-HPLC analysis was carried out using Waters I-125 and I-60 columns in series with 0.5 M sodium sulphate as eluent, 0.5 ml/min, monitored by refractive index detection, and the molecular weight was calculated according to retention time, using a non-linear standard curve based on dextran and heparin fragment standards.

The number average molecular weight, $M_n$, was calculated from equation (1) using the absorption increase at 235 nm, $\epsilon = 7600$, $c = 50$ and $m_{n,u} = 12400$.

The results are given in the table below and as seen, close agreement was obtained between the calculated and observed number average molecular weights.

TABLE I

| Time (hours) | $A_{235}$ | $\Delta A_{235}$ | $M_n$ ($\Delta A$) (daltons) | $M_n$ (HPLC) (daltons) | $M_n$ ($\Delta A$)/ $M_n$ (HPLC) % |
|---|---|---|---|---|---|
| 0 | 4.5 | 0 | — | — | — |
| 1.0 | 28.83 | 24.33 | 6912 | 6750 | 102.4 |
| 2.0 | 47.67 | 43.17 | 5148 | 4661 | 110.4 |
| 3.0 | 63.43 | 58.93 | 4242 | 4261 | 99.6 |
| 3.5 | 70.03 | 65.53 | 3951 | 3863 | 102.3 |
| 4.0 | 77.5 | 73.00 | 3666 | 3830 | 95.7 |
| 4.5 | 83.2 | 78.7 | 3475 | 3565 | 97.5 |
| 5.5 | 94.4 | 89.9 | 3153 | 3145 | 100.3 |
| 22 | 242.5 | 238 | 1415 | 1405 | 100.7 |
| | | | | | 101.1 |
| | | | | | ±4.4 |
| | | | | | (S.D.) |

EXAMPLE 2

The purpose of the experiments outlined below was to produce LMW-heparin of a weight average molecular weight ($M_w$) of 6500±500 dalton.

From FIG. 1 the number average molecular weight ($M_n$) corresponding to a $M_w = 6500$ dalton was found to be about 3500 dalton.

Five different heparins (see table below) were chosen for enzymatic depolymerization. The change in optical density at 235 nm ($\Delta A_{235}$ (calculated)) corresponding to a $M_n$ in the reaction mixture of 3500 dalton (in one experiment 3400 dalton) was calculated for each heparin from equation 2 using $c = 50$ mg/ml, $\epsilon = 7600$ and the $M_{n,u}$'s of the actual heparin lots (see table).

The enzymatic degradation of the heparins was performed as follows:

Heparin was dissolved in a concentration of 50 mg/ml in 0.1 M sodium acetate buffer pH 7.0 containing traces of calcium (0.0005 to 0.01 M). The solution was heated to 30° C. and heparinase was added in the amount necessary to depolymerize the heparin to the desired $M_n$ in about 48 hours.

The change in optical density at 235 nm ($\Delta A_{235}$) was measured repeatedly in samples of reaction mixtures after dilution with 1.7 M perchloric acid, pH below 2.5. When $\Delta A_{235}$ had reached the calculated value, $\Delta A_{235}$ (calculated), the enzymatic depolymerization was halted and the LMW-heparin product was precipitated by addition of alcohol and the depolymerized product was purified by methods well known in the art e.g. bleaching, sterile filtration and alcohol precipitation. Characteristics of the products from 5 independent experiments are shown in the following table.

TABLE II

| Experiment No. | Batch size (g) | $M_{n,w}$ of heparin (dalton) | Desired $M_n$ in product (dalton) | $\Delta A_{235}$ (calculated) | Amount of heparinase used (NOVO units/g heparin) |
|---|---|---|---|---|---|
| 1 | 1000 | 10100 | 3500 | 70.94 | 53 |
| 2 | 1000 | 12400 | 3500 | 77.93 | 65 |
| 3 | 1200 | 13900 | 3400 | 84.43 | 73 |
| 4 | 1000 | 11600 | 3500 | 75.81 | 60 |
| 5 | 1000 | 11200 | 3500 | 74.64 | 62 |

| Experiment No. | Final $\Delta A_{235}$ in reaction mixture | Yield of product % (w/w) | $M_n$ in product (dalton) | $M_w$ in product (dalton) | Biological activity* of product IU/mg |
|---|---|---|---|---|---|
| 1 | 71.76 | 87.8 | 3690 | 6150 | |
| 2 | 77.40 | 93.9 | 3840 | 6510 | 76 |
| 3 | 83.97 | 90.6 | 3710 | 6630 | 77 |
| 4 | 75.07 | 90.5 | 3660 | 6180 | 82 |
| 5 | 74.80 | 93.0 | 3610 | 6610 | 82 |

*Biological activity by an amidolytic antifactor Xa assay using the 1. International LMW-heparin standard (National Institute for Biological Standards and Controls, London) as reference standard.

It appears from the above that all the final LMW-heparin products have a weight average molecular weight ($M_w$) within the desired range.

CONTINUOUS MODE

A continuous mode for depolymerization of heparin offers several advantages over batch depolymerization. It has already been pointed out that at the moment in time during a depolymerization reaction when the average molecular weight is just above the desired value a large proportion of the heparin fragments have the desired molecular weight but due to the random endolytic nature of the depolymerization they also have a proportionally large chance of becoming further depolymerized to give fragments of suboptimal size.

A LMW-heparin product with a narrow molecular weight distribution may be obtained from a continuous process by removing fragments of the desired molecular weight as soon as they are formed to prevent their further depolymerization. This may be done by continuous fractionation of the depolymerization reaction mixture as the depolymerization process proceeds by filtration using a selective filter medium allowing molecules of the desired molecular weight to pass while recycling higher molecular weight material (including enzyme) to be further depolymerized.

It has been found, however, through a number of experiments that the molecular weight of heparin fragments able to pass an ultrafiltration membrane depends strongly on the heparin concentration in the retentate. Higher heparin concentration in the retentate gave higher molecular weight of the fragments in the filtrate.

Also other parameters such as the average molecular weight and polydispersity of the retentate, pH, ionic strength and content of organic modifiers in the reaction mixture as well as the area of the filter compared to product take out influence the molecular weight distribution of the filtrate.

This means that it is not possible to rely on the properties of the filter medium alone to ensure a constant desired molecular weight LMW-heparin product in the filtrate A large number of parameters must be kept at constant levels in the retentate (i.e. in the depolymerization reaction mixture) in order to obtain a product filtrate with constant, desired molecular weight properties, i.e. average molecular weight and polydispersity.

Due to the removal of product by filtration during the continuous depolymerization reaction it would be a complex problem to calculate, establish and maintain the necessary constant conditions or steady state in the depolymerization reaction mixture.

According to the present invention this problem has been solved by continuously or frequently measuring deviations of $M_n$ and polydispersity D in the filtrate from the desired values whereupon easily controllable reaction parameters in the depolymerization reaction notably substrate concentration; substrate feed rate; enzyme activity, reaction temperature; pressure drop over the membrane filter; and retentate recirculation flow are continuously or frequently changed so as to reduce and keep the deviations from the desired values within specified limits.

By employing the rapid response $A_{235}$ measurement analysis in their experiments the inventors hereof established that steady state depolymerization of heparin can be achieved, and maintained over time. They learned which operating parameters may be controlled readily.

It has been found possible to obtain a constant, narrow molecular weight distribution in the filtrate from a continuous depolymerization of heparin with heparinase.

In a broad aspect the present invention provides a continuous process for the production of low molecular weight heparin (LMW-heparin) by enzymatic depolymerization of heparin comprising the steps of:

continuously feeding an aqueous solution of heparin into a heparinase containing reactor and therein subjecting the heparin to enzymatic depolymerization;

removing depolymerized heparin solution from the reactor, then subjecting the solution of depolymerized heparin to ultrafiltration thereby producing a retentate and a filtrate;

recycling at least a portion of the retentate to the reactor, and;

recovering an LMW-heparin product from the filtrate;

the process parameters of the enzymatic depolymerization reaction being corrected as necessary to counteract deviations in the average molecular weight and polydispersity of the LMW-heparin product from desired values.

More specifically the present invention provides a continuous process as described above wherein the average molecular weight and the polydispersity of the filtrate are continuously or frequently determined whereupon deviations from the desired values are counteracted by correcting the process parameters of the enzymatic depolymerization reaction.

The molecular weight of the product may be determined by a number of different methods, e.g. gel permeation chromatography (GPC/HPLC) (N. Sugisaka, F. J. Petracek: Rapid molecular size characterization of heparins by high pressure liquid chromatography. Fed.-Proc. 36(1), 89-92, 1977), low angle laser light scattering (LALLS) (D. Lecacheux, R. Panams, G. Brigand,, G. Martin: Molecular weight distribution of carrageenans by size exclusion chromatography and low angle laser light scattering. Carbohydrate Polymers 5, 423-440, 1985), low angle X-ray scattering (S. S. Stivala, M. Herbst, O. Kratky, I. Pilz: Physico-chemical studies of fractionated bovine heparin V, Arch.Biochem.Biophys 127, 795-802, 1968), viscosity measurements and equilibrium centrifugation (S. E. Lasker, S. S. Stivala: Physicochemical studies of fractionated bovine heparin I. Arch.Biochem.Biophys. 115, 360-372, 1966), and osmotic pressure measurements and dialysis equilibrium (K. E. van Holde: Physical Biochemistry, section 2.3, p. 39-47. Prentice-Hall, Inc., New Jersey, 1971). However, a more preferred method would be one with a minimal lag time such as a spectrophotometric determination of functional groups created in the depolymerization process.

As has been described the enzymatic depolymerization process using heparinase lends itself to a spectrophotometric molweight determination since the enzymatic process is eliminative creating endgroups consisting of a Δ4.5-unsaturated-iduronic acid derivative with a distinct UV-absorption at 230-235 nm. The relationship between $M_n$ and increase in absorption at 235 nm ($\Delta A_{235}$) for a batch depolymerization process is given by $$\Delta A_{235} = c \cdot \epsilon \left( \frac{1}{M_n} - \frac{1}{M_{n,u}} \right) \quad (1)$$

where $M_{n,u}$ is the number average molecular weight of the heparin substrate, c is substrate concentration (g/l) and $\epsilon$ is the absorption coefficient of the unsaturated depolymerization product.

Although equation (1) applies to a batch depolymerization process it has now been found that $M_n$ of the product filtrate from the continuous depolymerization reaction can be calculated using equation (1) and a value of $\epsilon = 7600$ provided that the system is in or near steady state condition. Deviations from steady state reduces the accuracy of the calculation of $M_n$, but still gives information on the direction of the necessary changes. In equation (1) $M_{n,u}$ is known, $\Delta A_{235}$ is measured using e.g. an on-line spectrophotometer, and c may be found measuring the refractive index RI of the filtrate using an on-line calibrated RI-detector, or by measuring the UV-absorption at two different wave lengths, e.g. 197 and 235 nm.

According to a preferred embodiment of the present invention the light absorption of the filtrate is measured and change therein is used to control the depolymerization reaction.

As RI and $A_{235}$ measurement on the filtrate gives almost instantaneous information about the status of the process the necessary corrections of the process parameters can be made immediately where deviations from the desired values of molecular weight or polydispersity are observed.

It is obvious for the person skilled in the art that the increase in UV-absorption caused by formation of unsaturated degradation products by the action of heparinase on heparin may be measured at other wave lengths than 235 nm. The absorption coefficient is, however, preferably measured at 235 nm because it has its maximum at this wave length.

The depolymerization reaction may be controlled by regulation of substrate feed rate, substrate feed concentration to substrate flow rate ratio, and enzyme activity. Changes of substrate feed rate may be obtained by changing substrate flow rate or substrate feed concentration or both. Changes of substrate feed concentration to substrate flow rate ratio may be obtained by changing substrate feed concentration or substrate flow rate or both. By "substrate flow rate" as used herein is meant volume of substrate per time unit (e.g. liter/hour). By "substrate feed concentration" is meant heparin concentration in substrate fed into the system (e.g. mg/ml). By "substrate feed rate" is meant weight of heparin fed into the system per time unit (e.g. g/hour). "Substrate flow rate" x "substrate feed concentration" = "substrate feed rate".

Enzyme activity may be increased by adding enzyme or by increase of reaction temperature and may be decreased by decreasing reaction temperature or by removing enzyme from the reactor (e.g. if immobilized). Further parameters which may be used to control the depolymerization reaction are the pressure drop over the membrane filter or the retentate recirculation flow.

According to the present invention the corrections of the process parameters may be conducted as follows:

a) If $M_n$ of the filtrate is higher than desired, substrate feed rate may be decreased by decreasing substrate flow rate or substrate feed concentration or both or by increasing the enzyme activity. If $M_n$ is lower than desired the opposite applies.

b) If the polydispersity of the filtrate is higher than desired, substrate feed concentration to substrate flow rate ratio may be decreased by decreasing the substrate feed concentration or increasing substrate flow rate or both. If the polydispersity is lower than desired the opposite applies.

c) If $M_n$ and polydispersity both deviate from the desired values, combinations of the above mentioned corrections may be made. The corrections may conveniently be carried out as set forth in the following examples where example 3 illustrates regulation of $M_n$ alone and example 4 illustrates regulation of $M_n$ and polydispersity in that order.

Figure 2:
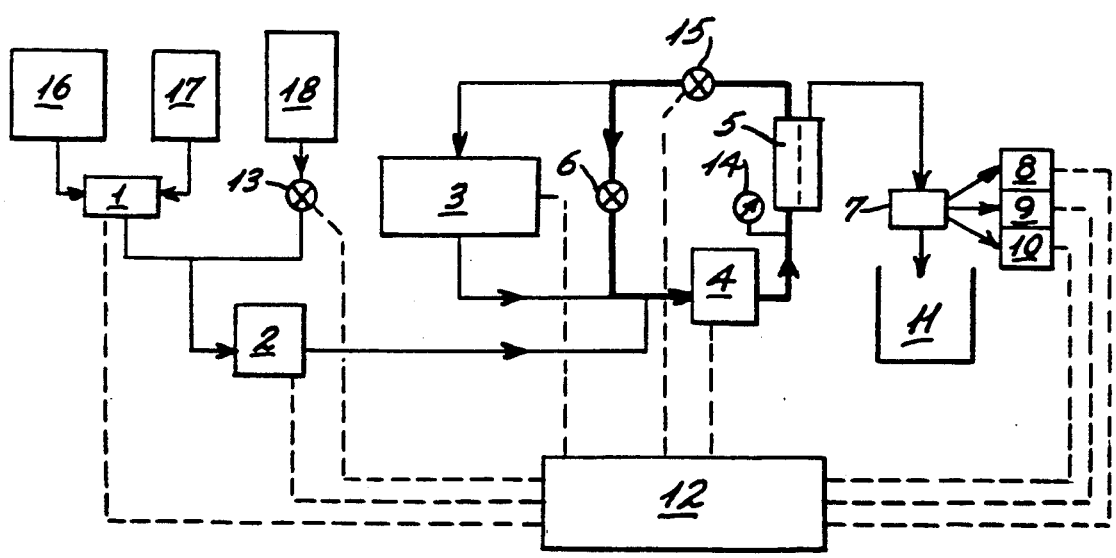
FIG. 2 illustrates the flow for a preferred mode continuous heparin depolymerization process.

To ensure a fast feed back control of the depolymerization reaction depending on the deviation in the average molecular weight and polydispersity from the desired values the process may be conducted as shown in FIG. 2. FIG. 2 illustrates a special embodiment of the present invention particularly useful for the enzymatic depolymerization of heparin to LMW-heparin of low polydispersity employing immobilized heparinase as the main source of enzyme. However, means for supplementing with liquid heparinase is also shown.

Heparin substrate of a predetermined desired concentration is provided by mixing of a heparin stock solution (16) with buffer (17) in mixer (1) and fed into a closed circuit reaction zone by means of a dosage pump (2). The reaction zone consists of a retentate circulation pump (4), an ultrafilter (5), an enzyme reactor (3) and a shunt line with a valve (6). Since the reaction zone is closed except for the substrate feed-line and the ultrafiltration membrane, the filtrate flow will be equal to the substrate flow. A fast retentate flow is desirable to prevent polarization on the ultrafiltration membrane. This might, however, be damaging to the immobilized enzyme bed due to the pressure drop created across the bed. The main stream of retentate is therefore circulated through the shunt-line and valve (6), which is opened or closed to regulate the pressure drop across the enzyme bed.

The filtration pressure across the ultrafiltration membrane which is measured by manometer (14) may be increased as necessary by partly closing valve (15). The enzyme reaction temperature may be regulated by a water circulation mantle (around reactor 3 (not illustrated)). The LMW-heparin fraction leaving the depolymerization zone in the ultrafiltrate is analyzed to determine its average molecular weight and polydispersity. A sampling device (7), schematically indicated automatically takes samples before the filtrate passes into collector (11). The samples pass to instruments 8, 9, 10.

In the preferred illustrated embodiment of the present invention three parameters are measured: refractive index (RI), UV-absorption at 235 nm ($A_{235}$) and polydispersity (D). RI and $A_{235}$ are measured continuously or at short intervals by means of an RI-detector (8) and a spectrophotomer (9), respectively. D is determined occasionally by GPC-HPLC determination of $M_n$ and $M_w$ by chromatography instrument(s) (10). The data obtained from the samples are fed to a data processing unit (12) which calculates LMW-heparin concentration c (g/liter) from RI, number average molecular weight $M_n$ (Dalton) from c and the increase in absorption at 235 nm ($\Delta A_{235}$), enzyme activity (NE) from $NE = \Delta A_{235} \times$ flow rate, and polydispersity D from HPLC data. The processing unit regulates the process based on the calculated parameters $M_n$, D, c and NE by regulating substrate concentration via mixer (1), flow rate (SFV) via pump (2), enzyme activity from stock solution (18) via an enzyme addition valve (13) and/or a reaction temperature regulation mean (not shown), pressure drop over the membrane filter through valve (15) and the retentate circulation flow through circulation pump (4). The control circuits and the automatically operated equipment schematically shown in the flow sheet of FIG. 2 are conventional systems and devices and, therefore, need not to be described herein.

A continuous mode depolymerization of heparin in a laboratory scale system according to FIG. 2 is hereinafter exemplified.

EXAMPLE 3

*Flavobacterium heparinum* was grown on a heparin containing substrate and heparinase prepared from a homogenized cell concentrate by filtration through 100 KD and concentration on 30 KD ultrafilters. The enzyme was immobilized on CNBr activated Sepharose 4B in the presence of heparin.

750 units of immobilized heparinase, with a calculated capacity of depolymerizing ~5–600 mg/h of heparin of $M_{n,u} \sim 11500$, to LMW-heparin of $M_n \sim 4000$ daltons at ambient temperature, was placed in enzyme reactor (3). The system was filled with heparin substrate solution (10 mg/ml in 0.1 M Na-acetate, 0.005 M Ca-acetate pH 7.0), freed of entrapped air, and heparin substrate was fed into the system at an initial rate of 60 ml/h at ambient temperature.

After a few minutes the filtrate flow rate corresponded exactly to the substrate flow rate. Fractions of 10 ml were collected throughout the experiment. Refractive index, RI was monitored continuously, and absorption at 235 nm, $A_{235}$, was measured frequently, at least once per fraction, after dilution of samples with 1.7 M perchloric acid.

Figure 3:
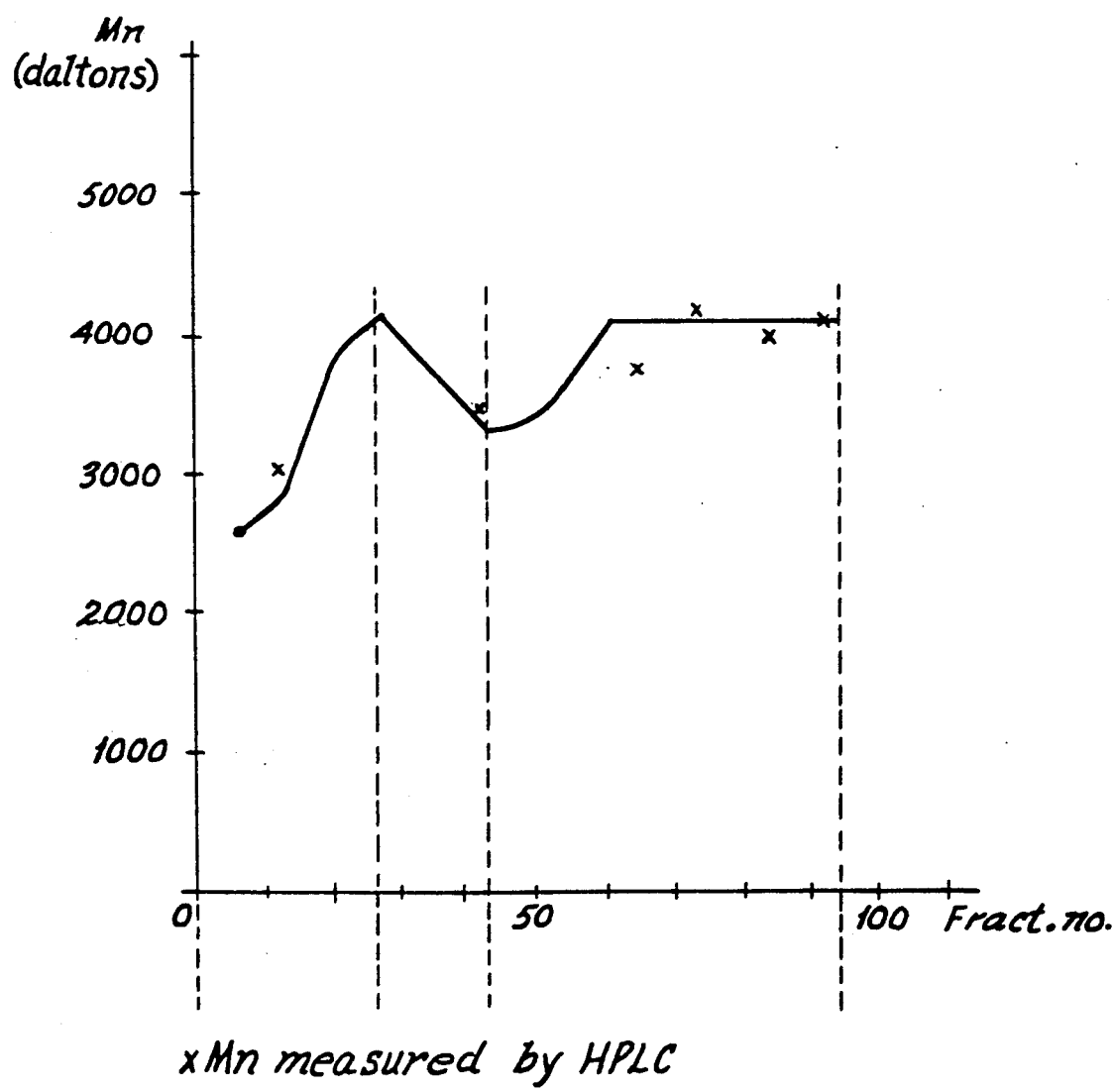
FIG. 3 illustrates the HPLC measurements on different fractions sampled during the course of the continuous depolymerization of Example 3.

The number average molecular weight of the product, $M_n$ was calculated from the RI and $A_{235}$ values, and plotted against fraction number, as shown in FIG. 3.

HPLC-molecular weight analysis was carried out on a few fractions. The results confirm the calculated $M_n$ values as is apparent from FIG. 3 and in addition provide figures of weight average molecular weight, $M_w$, and polydispersity, D (from $D = M_w/M_n$) As the calculated $M_n$ corresponds well to $M_n$ value measured by HPLC the present example establishes that equation (1) can be used for the calculation of $M_n$ of the LMW-heparin product from a continuous depolymerization reaction.

The RI, $A_{235}$ procedure gives almost instantaneous information about the status of the process and allows corrective measures to be taken.

The present example furthermore illustrates obtaining a desired $M_n$ of the product by adjusting the substrate flow rate at fixed substrate feed concentration.

The experiment was carried out in three phases.

1) Flow rate 60 ml/hour: In this phase the $M_n$ of the product increased steadily and reached the desired value of ~4000 daltons after ~22 fractions.

2) Flow rate 30 ml/hour: After a few additional fractions the flow-rate was reduced to 30 ml/hour from fraction No. 27.

As seen from FIG. 3 the response was a steady decrease of $M_n$.

3) Flow rate 60 ml/hour: When the $M_n$ of the product had reached a value of 3300 daltons in fraction No 43 still descending, the initial flow rate of 60 ml/hour was resumed. The drop in $M_n$ stopped and was followed again by a steady increase which levelled out at fraction No. 60. From this point and through the rest of the experiment the small variations in the observed parameters indicated that a steady state was obtained.

For comparison immobilized heparinase was employed to depolymerize heparin in batch-type-reactions. In one experiment heparin was depolymerized to a number average molecular weight, $M_n \sim 4000$ daltons, comparable to the $M_n$ of the "steady state" product filtrate of the continuous process.

In another experiment, heparin was depolymerized to a weight average molecular weight, $M_w$ comparable to the $M_w$ of the "steady state" product of the continuous process.

$M_n$ and $M_w$ distributions were analyzed by HPLC. Results from the two types of reaction are given in the table below.

TABLE III

| Fraction No. | Continuous reaction | | | |
|---|---|---|---|---|
| | $M_w$ | $M_n$ | D | $M_n$ (calc. from RI and $A_{235}$) |
| | (measured by HPLC) | | | |
| 65 | 6152 | 3734 | 1.65 | 3950 |
| 74 | 7365 | 4179 | 1.76 | 4120 |
| 84 | 6650 | 3979 | 1.67 | 3950 |
| 94 | 6823 | 4114 | 1.66 | 4120 |
| average | 6748 | 4002 | 1.69 | 4035 |
| | S.D. ±500 | S.D. ±200 | S.D. ±0.05 | S.D. ±100 |

| | Batch reaction 1 (to give $M_n \sim 4000$) | | |
|---|---|---|---|
| Sample No. | $M_w$ | $M_n$ | D |
| 1 | 7894 | 3996 | 1.98 |

TABLE III-continued

| | | | |
|---|---|---|---|
| 2 | 7507 | 3937 | 1.91 |
| 3 | 7503 | 3897 | 1.93 |
| average | 7635 | 3943 | 1.94 |
| | S.D. ±225 | S.D. ±50 | S.D. ±0.04 |

| Batch reaction 2 (to give $M_w \sim 6700$) | | |
|---|---|---|
| $M_w$ | $M_n$ | D |
| 6681 | 3175 | 2.10 |

It appears from the above that the polydispersity of the LMW-heparin product form the continuous process is remarkably reduced as compared to a batch depolymerization process. It furthermore appears the calculated $M_n$ values are in good agreement with the measured $M_n$ values for the continuous reaction.

EXAMPLE 4

Heparin was depolymerized to LMW-heparin by immobilized heparinase, using the apparatus and methods of detection and calculation of example 3.

Regulation of the process was carried out in two phases.

Figure 4:
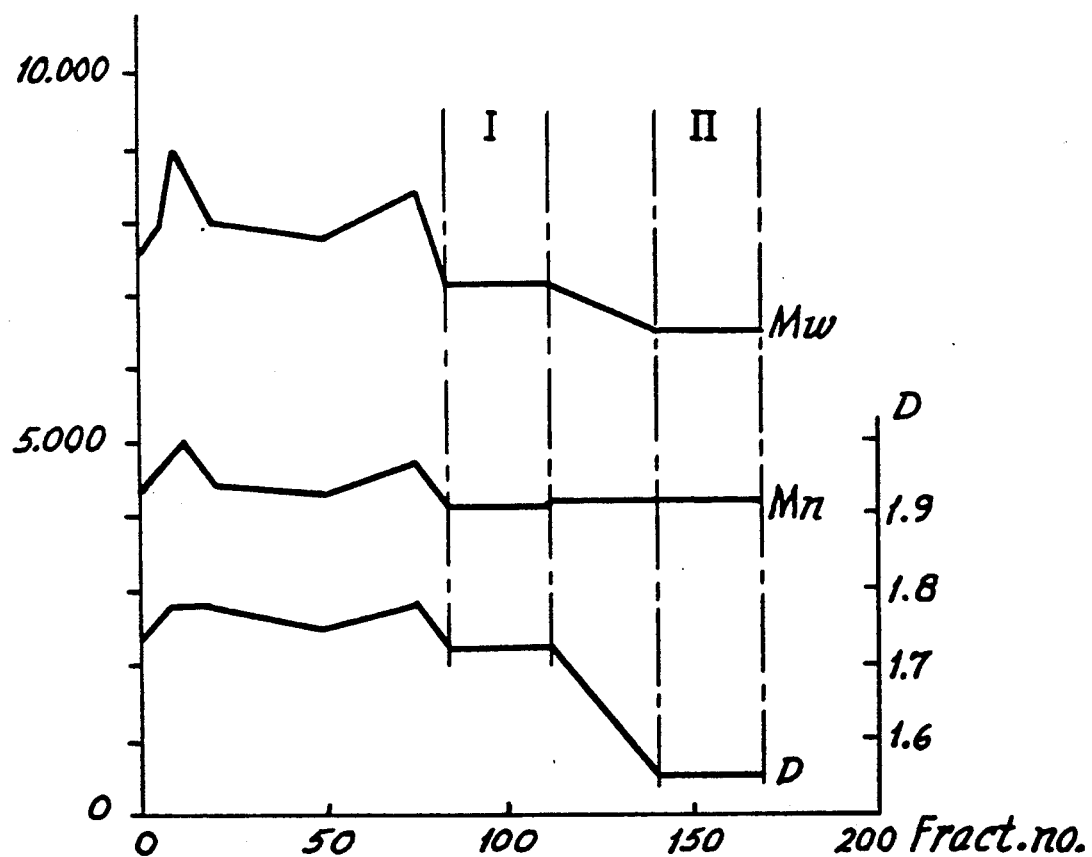
FIG. 4 illustrates the molecular weight of different fractions during the continuous depolymerization of Example 4

In phase 1, as in example 3 regulation of substrate flow rate in response to deviation of $M_n$ in the product filtrate from the desired value about 4000 dalton was used to obtain a steady state in which the substrate flow rate corresponded to the desired $M_n$-value in the filtrate As seen in table IV and illustrated in FIG. 4 the initial substrate flow rate of 60 ml per hour of 10 mg per ml heparin substrate was reduced step-wise to 12 ml per hour corresponding to a substrate feed rate of 120 mg per hour to obtain a steady state (I) as from fraction No. 78.

The number average molecular weight and polydispersity of the steady state LMW-heparin product found by GPC-HPLC analysis was $M_n = 4150$ and $D = 1.71$ corresponding to a weight average molecular weight $M_w = 7100$.

In the second phase from fraction No. 114 the substrate feed concentration to substrate flow rate ratio was changed 25-fold by a five fold reduction of substrate feed concentration to 2 mg heparin per ml and a five-fold increase in substrate flow rate to 60 ml per hour thereby maintaining the substrate feed rate of 120 mg heparin per hour.

The changes resulted in a new steady state (II) from fraction No. 140 as seen from table IV and FIG. 4.

The number average molecular weight $M_n$ remained practically unaltered but the polydispersity of the product was considerably decreased to the low value of $D = 1.55$, corresponding to $M_w = 6450$ as seen in table IV and FIG. 4.

TABLE IV

| Fract. No.*) | Subst.conc. (mg/ml) | Flow rate (ml/h) | $M_n$ (calculated) | $M_n$ | D | $M_w$ |
|---|---|---|---|---|---|---|
| | | | | (GPC-HPLC anal.) | | |
| 1 | 10 | 60 | 3850 | 4300 | 1.73 | 7450 |
| 6 | — | — | 4300 | 4500 | 1.73 | 7800 |
| 7 | — | 30 | 4500 | | | |
| 9 | — | — | 4700 | 4750 | 1.78 | 8450 |
| 10 | — | 18 | 4900 | 5000 | 1.76 | 8800 |
| 20 | — | — | 4560 | 4450 | 1.79 | 7950 |
| 50 | — | — | 4100 | 4350 | 1.76 | 7650 |
| 75 | — | — | 4350 | 4700 | 1.78 | 8350 |
| 80 | — | 12 | 4300 | 4150 | 1.71 | 7100 |
| 100 | — | — | | 4150 | 1.69 | 7000 |
| 110 | — | — | | 4050 | 1.74 | 7050 |
| 115 | 2 | 60 | | 4100 | 1.67 | 6725 |
| 130 | — | — | | 4250 | 1.65 | 7000 |
| 140 | — | — | | 4050 | 1.58 | 6400 |

TABLE IV-continued

| Fract. No.*) | Subst.conc. (mg/ml) | Flow rate (ml/h) | $M_n$ (calculated) | $M_n$ | D | $M_w$ |
|---|---|---|---|---|---|---|
| | | | | (GPC-HPLC anal.) | | |
| 150 | — | — | | 4150 | 1.55 | 6450 |
| 160 | — | — | | 4200 | 1.55 | 6500 |
| 170 | — | — | 4500 | 4300 | 1.55 | 6650 |

*)Fraction size: 10 ml

It may be seen in the examples 3 and 4 data, graphically illustrated in FIGS. 3 and 4 respectively, that the continuous depolymerization reaction mode of the invention operated for extended periods without upsets demonstrating that the continuous depolymerization reaction system is relatively stable. Accordingly, practice of this invention contemplates conduct of continuous depolymerization of heparin without control thereof through $A_{235}$ or like measurements, e.g. control through HPLC molecular weight analysis measurement. However, as has already been pointed out, control through $A_{235}$ measurement constitutes the preferred practice.

Also, it may be seen in the data from Example 4 that quite low polydispersibility levels can be achieved in the LMW-heparin product from a continuous depolymerization mode of the invention, achieving (see fractions 140 to 170) a polydispersibility in the range of 1–1.6 that is preferred in practice of this invention.

We claim:

1. A continuous process for the production of a low molecular weight heparin product of a predetermined molecular weight by enzymatic depolymerization of heparin comprising the steps of:
   continuously feeding an aqueous solution of heparin into a heparinase containing reactor and therein subjecting the heparin to an enzymatic depolymerization reaction;
   continuously removing reaction mixture solution from said reactor, then subjecting said removed reaction mixture solution to ultrafiltration, thereby producing a filtrate containing low molecular weight heparin and a retentate;
   recycling retentate to said reactor;
   measuring light absorption of the filtrate, to determine therefrom the number average molecular weight of heparin in the filtrate, said measurement being used as a basis to control said enzymatic depolymerization reaction; and,
   measuring the refractive index of the ultra filtrate to determine therefrom the polydispersity of the low molecular weight heparin in the filtrate, said enzymatic depolymerization reaction being controlled in accordance with the measured refractive index and the light absorption measurement, to produce a filtrate comprising a low molecular weight heparin of low polydispersity and predetermined molecular weight.

2. A process according to claim 1 wherein continuous measurements of refractive index and ultraviolet absorption at $235_{nm1}$ are made on the filtrate, both measurement results being employed to ascertain deviations requiring controlled change in the depolymerization reaction.

3. A process according to claim 1 wherein the feed rate of the aqueous solution of heparin is decreased if the average molecular weight of depolymerized heparin in the filtrate becomes higher than desired.

4. A process according to claim 1 wherein the feed rate of the aqueous solution of heparin is increased if the average molecular weight of depolymerized heparin in the filtrate becomes lower than desired.

5. A process according to claim 1 wherein the ratio of heparin concentration in the feed solution of heparin to flow rate of feed solution is decreased when the polydispersity of the depolymerized heparin in the filtrate becomes higher than desired.

6. A process according to claim 1 wherein the ratio of heparin concentration in the feed solution of heparin to flow rate of feed solution is increased when the polydispersity of the depolymerized heparin filtrate becomes lower than desired.

7. A process according to claim 1 wherein the enzyme activity of the heparinase is varied, being decreased if the molecular weight of the low molecular weight heparin depolymerization product becomes too low and enzyme activity being increased if the molecular weight of the low molecular weight heparin depolymerization product becomes too high.

8. A process according to claim 1 wherein the heparinase is used in immobilized form.

9. A process according to claim 1 wherein the polydispersity of the depolymerization product is from about 1 to about 1.6.

* * * * *